United States Patent [19]

McCartney

[11] Patent Number: 4,707,903

[45] Date of Patent: Nov. 24, 1987

[54] METHOD AND APPARATUS FOR PULLING A NOSE PLUG FROM A LOCK

[76] Inventor: Charles L. McCartney, Rte. 1, Box 898B, Ingleside, Tex. 78362

[21] Appl. No.: 8,589

[22] Filed: Jan. 29, 1987

[51] Int. Cl.[4] .............. B23P 19/02

[52] U.S. Cl. .............. 29/426.5; 29/258; 29/804; 70/337; 70/371

[58] Field of Search .............. 29/239, 244, 256, 259, 29/263, 264, 265, 266, 402.03, 402.04, 402.08, 426.4, 426.5, 804, 258; 70/337, 338, 339, 371

[56] References Cited

U.S. PATENT DOCUMENTS

| | | | |
|---|---|---|---|
| 93,911 | 8/1869 | Searle | 29/259 |
| 1,665,015 | 4/1928 | Benham | 70/339 |
| 3,599,311 | 8/1971 | Ellis | 29/266 X |
| 3,619,887 | 11/1971 | McLaughlin | 29/267 |
| 3,816,899 | 6/1974 | Kitts | 29/263 |
| 3,837,196 | 9/1974 | Gartner et al. | 70/339 |
| 4,059,883 | 11/1977 | Osborne | 29/259 |
| 4,261,093 | 4/1981 | Steffen et al. | 29/426.4 |
| 4,307,983 | 12/1981 | Blough et al. | 29/426.4 X |
| 4,361,944 | 12/1982 | Hamilton | 29/256 |
| 4,586,233 | 5/1986 | Markisello | 29/426.5 X |

*Primary Examiner*—Howard N. Goldberg
*Assistant Examiner*—Andrew E. Rawlins
*Attorney, Agent, or Firm*—G. Turner Moller

[57] ABSTRACT

A nose plug puller for a Mosler type lock allows the nose plug to be pulled without damaging the nose plug or the lock, thereby saving time and cost. A key pin is inserted in the key slot and rotated until the end thereof is out of registry with the key slot. The key pin is then shifted radially outwardly to allow a pull shaft to be inserted in the key slot. The key pin is then shifted toward the center of the nose plug into force transmitting engagement with the pull shaft. An outward force is applied to the pull shaft and, acting through the key pin, pulls the nose plug out of press fit with the cam operating the wafers.

10 Claims, 8 Drawing Figures

METHOD AND APPARATUS FOR PULLING A NOSE PLUG FROM A LOCK

This invention relates to a technique for pulling a nose plug from a lock of the type used in safe deposit boxes.

One particular type safe deposit box lock, made by Mosler Co., is commonly used in banks, savings and loan institutions, deposit box facilities and the like for securing a door, usually pivoted on one side. Locks of this type require two keys for unlocking the lock, one key is always in the possession of the institution and one key is retained by the renter of the box. To open the box, the normal practice is for the institution employee or guard to insert the guard key in the lock, turn the key to prepare the lock to be opened by the customer's or rent key and then leave to allow the customer privacy to use the rent key to unlock the box. There is no likelihood that the lock cannot be opened because the institutional key is lost—in the worst circumstance, another key is available. It often occurs, however, that the customer loses or cannot locate his key and therefore cannot open the box.

In this circumstance, there are several alternatives. A conventional locksmith will probably drill the lock thereby destroying the nose plug. A more adroit locksmith may use a specially designed puller to pull the nose plug from the lock. Such nose pullers are available from Bradley Lock and Key Company of Savannah, Ga. and Lockmasters, Inc. of Nicholasville, Ky. The nose pullers of Bradley probably damage the nose plug to an extent that the nose plug must be replaced, at extra cost.

Lockmasters, Inc. provides a device known as a Mosler Nose Puller Component that is capable of pulling the nose plug without damaging it. This device includes an end inserted into the key slot and having a leaf spring type strap carried thereon. The strap is cammed into the plane of the key slot until it clears on the inside at which time the end of the leaf spring moves laterally into engagement with the inside face of the nose plug. A nut and spacer are used to pull the device outwardly away from the door thereby pulling the nose plug out of its passage in the lock. Although this device is operable, if it were decided not to pull the nose plug, this particular tool could not be removed without forcing the lock. In any event, it is this type of device to which this invention most nearly relates.

This invention comprises a five piece kit for pulling the nose plug of a Mosler type safety deposit box lock. The kit comprises a small T or I shaped bar, called a key pin, which is inserted into the key slot, rotated 90° or out of registry with the key slot and then moved laterally into the notch in the lock ring. A puller or pull shaft is then inserted into the key slot and the key pin moved laterally into a recess of the pull shaft. At this time, the key pin is in engagement with the rear face of the nose plug and acts to transfer any force applied to the pull shaft to the rear face of the nose plug. A support is then placed around the pull shaft and a nut threaded onto the end thereof. The nut is then screwed against the support which reacts against the door of the safety deposit box thereby applying an outward force against the nose plug and pulling it from the lock in an undamaged condition. A cam key is then inserted through the opening left by the nose plug into the operating cam from which the nose plug was pulled. The cam key is then turned to rotate the cam to spread the leaves or wafers of the lock thereby allowing the striker to retract and opening the lock. The truth of the matter is that it is easier and quicker to pull the nose plug than it is to describe it.

Disclosures of general interest are found in U.S. Pat. Nos. 3,599,311; 3,619,887; 4,059,883; and 4,361,944.

It is accordingly an object of this invention to provide an improved technique for pulling the nose plug of a safe deposit type lock.

Another object of this invention is to provide a method and apparatus for pulling the nose plug of a safe deposit type lock which leaves the lock, and all components thereof, undamaged.

Other objects and advantages of this invention will become more fully apparent as this description proceeds, reference being made to the accompanying drawing and appended claims.

IN THE DRAWINGS

Figures 1, 3:
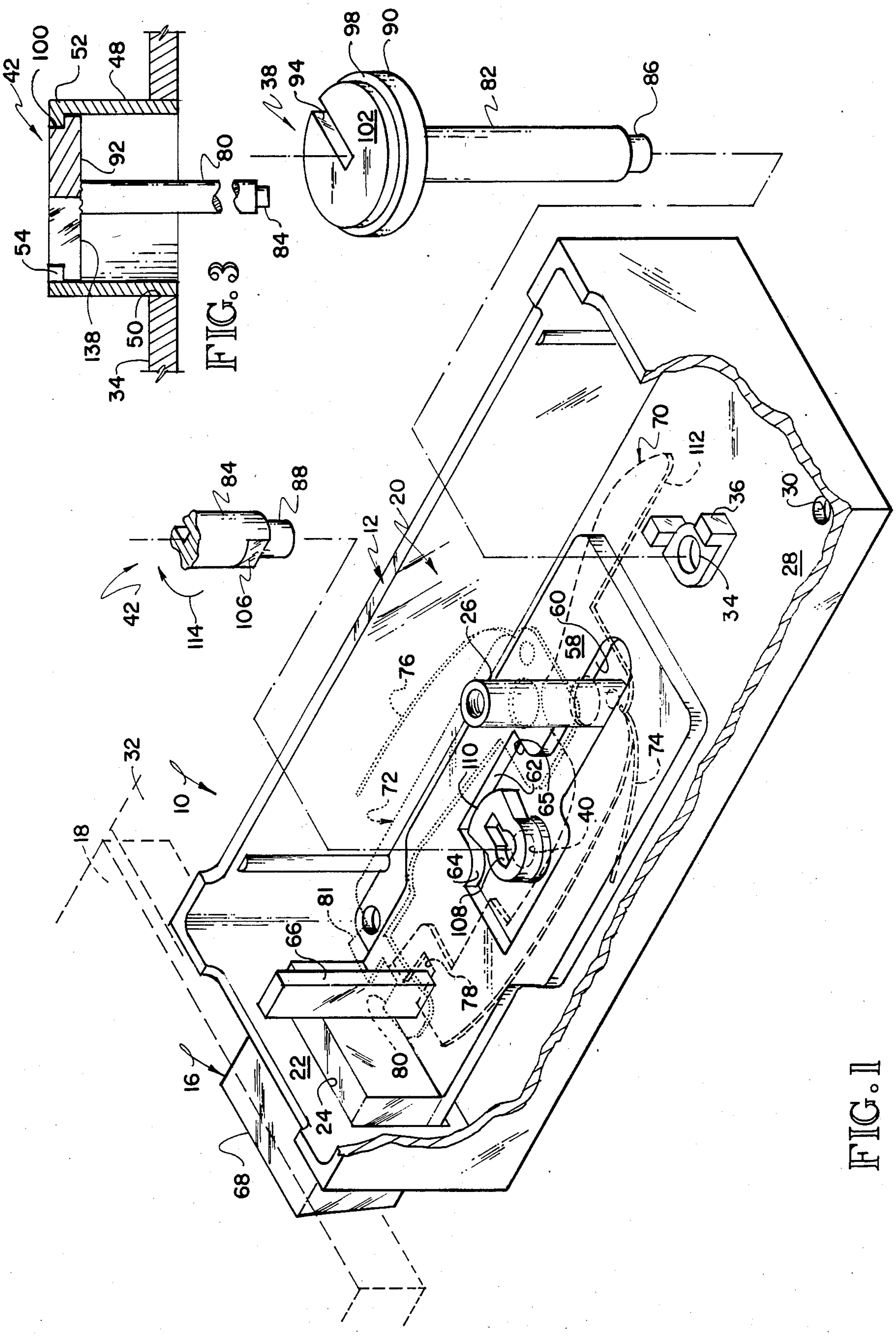
FIG. 1 is a partial exploded isometric view of a Mosler type safe deposit box lock.
FIG. 3 is an enlarged cross-sectional view of the cover of FIG. 2, taken substantially along line 3—3 thereof as viewed in the direction indicated by the arrows.
Figure 5:
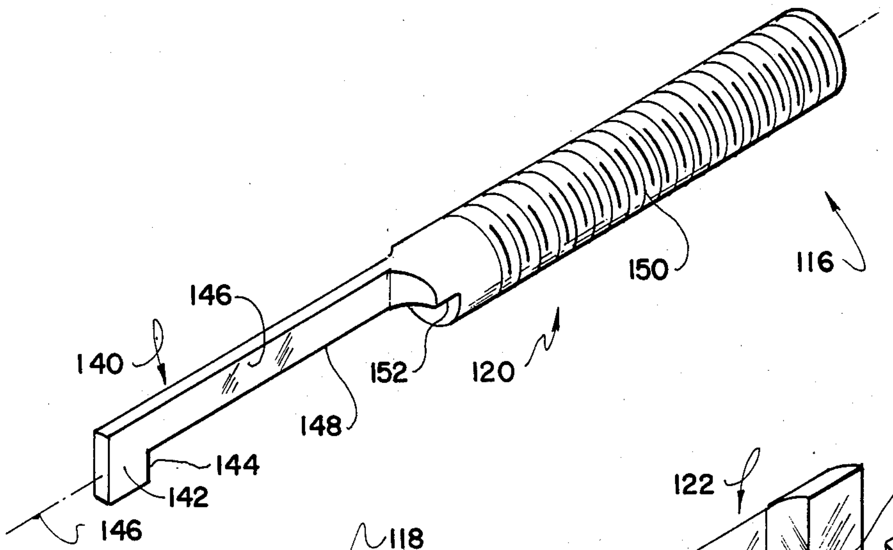
FIG. 5 is an isometric view of one embodiment of a pull shaft usable in the practice of this invention.
Figure 4:
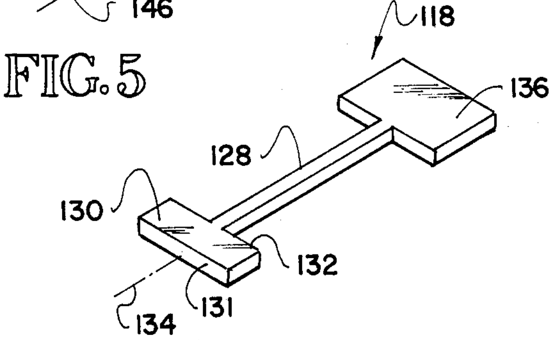
FIG. 4 is an isometric view of the key pin of this invention.
Figure 6:
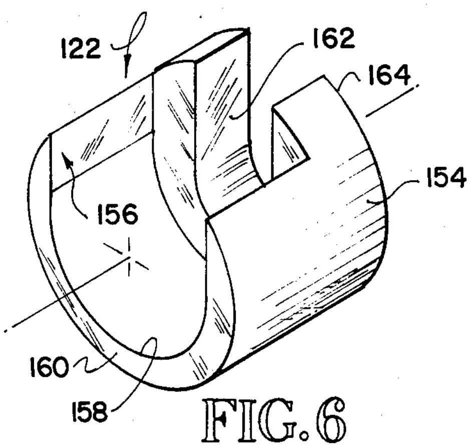
FIG. 6 is an isometric view of one form of support which may be employed in the practice of this invention.
Figure 7:
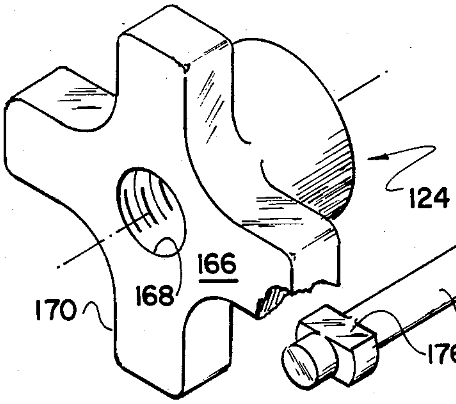
FIG. 7 is a front elevational view of a star nut usable in the practice of this invention.
Figure 8:
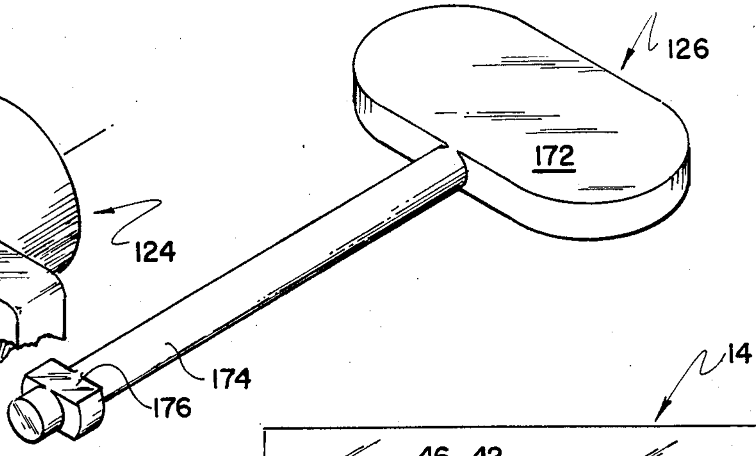
FIG. 8 is an isometric view of one form of a cam key usable in the practice of this invention.
Figure 2:
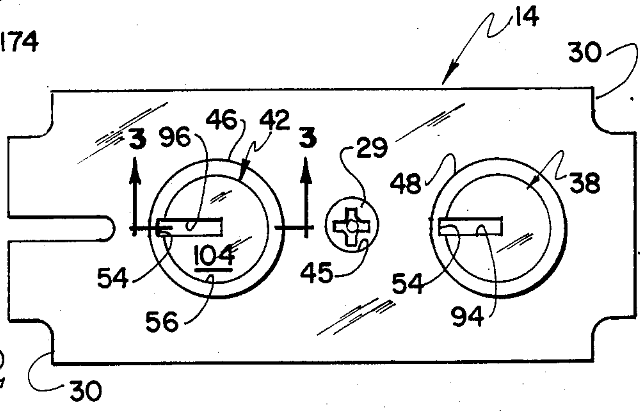
FIG. 2 is a front elevational view of the cover normally associated with the lock of FIG. 1, illustrating the nose plugs therein.

Referring to FIGS. 1-3, there is illustrated a Mosler type lock 10 comprising as major components a housing 12, a cover 14 secured to the hoousing 12, a striker 16 movable into and out of one end of the housing 12 into locking engagement with a strike plate 18 of a safety deposit box or other enclosure secured by the lock 10, and a lock mechanism 20 in the housing 12 for manipulating the striker 16 in response to the use of a pair of keys (not shown).

The housing 12 may be of any suitable type and is typically a rectangular brass open front housing having an end wall 22 providing a passage 24 therethrough for receiving the striker 16. An interiorly threaded post 26 is affixed to the housing back wall 28 and receives a fastener 29 for securing the cover 14 to the open front of the housing 12. A series of aligned openings or cutouts 30 are provided in the back wall 28 and in the cover 14 for receiving a threaded fastener (not shown) for securing the housing 12 to the back of a door 32 comprising part of the secured enclosure.

The cover back wall 28 also includes a first opening 34 having a fitting 36 secured therearound for receiving the shaft end of a nose plug 38 manipulated by the guard key (not shown). A similar opening 40 is provided for receiving the shaft end of a nose plug 42 manipulated by the rent key (not shown).

The cover 14 is shown best in FIG. 2 and comprises a generally rectangular plate providing the cutouts 30 at each corner and a central aperture 45 aligned with the post 26 for receiving the fastener 29 securing the cover 14 to the housing 12. A pair of outwardly projecting cylindrical sections or sleeves 46, 48 are press fit into openings 50 in the plate and project through openings (not shown) in the door 32. Thus, with the door 32 closed against the striker plate 18, the only elements of the lock 10 which are visible are the edges of the sleeves 46, 48 and the ends of the nose plugs 38, 42.

A peculiarity of the sleeves 46, 48 is shown best in FIGS. 2 and 3. The sleeves 46, 48 comprise an inwardly extending rim 52 having a notch or recess 54 therein communicating with the passage 56 provided by the sections 46, 48. The notches 54 allow passage of the conventional keys (not shown) and are used in the practice of this invention as more fully pointed out hereinafter.

The striker 16 is of somewhat complex shape and includes a plate 58 having an elongate notch segment 60 received on the post 26 and an enlarged notch segment 62 providing a pair of cam faces 64, 65 for purposes more fully apparent hereinafter. A rib 66 extends perpendicularly to the plate 58 and acts to prevent movement of the striker 16 until the keys have unlocked the lock mechanism 20. The striker 16 also includes a relatively massive rectangular block 68 extending through the passage 24 into locking engagement with the strike plate 18.

The lock mechanism 20 inside the housing 12 is of conventional Mosler type including a plurality of leaves or wafers 70 received on the post 26 and manipulated by the guard key and an alternating series of leaves or wafers 72 received on the post 26 and manipulated by the rent key. The wafers 70, 72 each include a spring wire 74, 76 reacting against the housing 12 to bias the wafers in a counter rotary fashion about the axis of the post 26.

The ends of the wafers 70, 72 adjacent the striker rib 66 include notches 78, 80 which are normally biased away from the rib 66 by the spring wires 74, 76 into a non-aligned position preventing rightward movement of the rib 66 in FIG. 1. When the keys manipulate the wafers 70, 72 as more fully explained hereinafter, the wafers 70, 72 counter rotate about the post 26 to place the notches 78, 80 in an aligned position allowing movement of the rib 66 thereinto thereby allowing retraction of the striker 16 and unlocking of the lock 10.

The wafers 72, normally manipulated by the rent key, each include an offset notch 81. The spring 76 normally biases the wafer 72 downwardly in FIG. 1 to place the notch 81 in alignment with the rib 66. The importance of the notch 81 will be more fully apparent hereinafter.

The nose plugs 38, 42 also comprise part of the lock mechanism 20 and are only slightly different. Each comprises an intermediate shaft 82, 84 having a round reduced end 86, 88 respectively received and journalled in the openings 34, 40. The shafts 82, 84 connect to an enlarged head 90, 92 having a key slot 94, 96 therein. As is most evident in FIGS. 1 and 3, the heads 90, 92 include a circular recess 98, 100 so that, when assembled, the top face 102, 104 of the nose plugs 38, 42 are flush with the upper edge of the cylindrical sections 46, 48. The nose plug 42 differs from the nose plug 38 in providing a pair of flats 106 adjacent the lower end of the shaft 80 press fit in a similar opening 108 of a cam element 110 received in the notch segment 62 of the striker 16.

Operation of the lock 10 should now be apparent. When it is desired to unlock the lock 10, the guard key (not shown) is placed through the key slot 94 of the nose plug 38 and the aligned notch 54 of the sleeve 48 and turned. The guard key moves against and cams the end 112 of all of the wafers 70 and thereby rotates all of the wafers 70 about the post 26 to position the slots 78 thereof in alignment with the rib 66. This does not unlock the lock 10 because the striker 16 has to be moved to the right in FIG. 1.

The rent key (not shown) is placed through the key slot 96 of the nose plug 42 and the aligned notch 54 of the sleeve 46 and turned in a clockwise direction suggested by the arrow 114 in FIG. 1. Two things happen. First, the wafers 72 are rotated about the post 26 thereby aligning the notches 80 with the notches 78 so that the rib 66 is free to move to the right in FIG. 1. Second, the cam element 110 engages the cam face 65 and moves the striker plate 58 to the right in FIG. 1 thereby retracting the striker block 68 from the striker plate 18 and unlocking the lock 10 to allow opening of the door 32 of the secured enclosure.

To lock the lock 10, the guard key (not shown) is turned and removed from the key slot 94 of the nose plug 38. The rent key (not shown) is then rotated in a counter clockwise direction opposite to the arrow 114. The cam element 110 moves into engagement with the cam face 64 and moves the striker plate 58 to the left in FIG. 1 thereby moving the striker block 68 into latching engagement with the strike plate 18 and moving the rib 66 out of the slot provided by the aligned notches 78, 80. This allows the wafers 70, 72 to counter rotate about the post 26 under the influence of the spring wires 74, 76. As heretofore described, the lock 10 will be recognized by those skilled in the art as a Mosler type safety deposit lock. In the event greater information is required, attention is directed to publications of the Mosler Safe Company.

As suggested previously, difficulties arise in a bank, savings and loan, or other safety deposit box providing institutions when access to the safety deposit box is required without having the rent key, as when a customer loses the rent key, when the safety deposit box is apparently abandoned by failure to pay the requisite fees, when the customer dies or the like. Although there are locksmith techniques available to open the lock, they either destroy the nose plug 42 or have other disadvantages.

To overcome these difficulties, the nose puller kit 116 of this invention is provided. The nose puller kit 116 comprises, as major components, a force transmitting element or key pin 118, a pull shaft 120, a support 122, a nut 124 and a cam key 126.

The key pin 118 is an important element of this invention and comprises a T or I shaped component conveniently made from a flat metal blank having a slender central section 128 which is preferably of square cross section, but which may conceivably be rounded. As pointed out more fully hereinafter, the central section 128 is not substantially larger than the area provided by the notch 54 in the cylindrical section 46. The key pin 118 also includes a transverse first end 130 extending laterally of the central section 128 and providing a pair of shoulders 131, 132 generally perpendicular to an axis 134 defined by the central section 128. The central section 128 and first end 130 are sufficiently thin to pass through the key slot 96 of the nose plug 42 and the aligned notch 54 in the sleeve 46. The key pin 118 also conveniently includes a second flat transverse end 136 which allows the user to hold the key pin 118 against the pull shaft 120 when in use. Because the second end 136 is not inserted through the key slot 96, its size and shape is susceptible to wide variation. Conveniently, it is somewhat larger than the first end 130 allowing the user to handle it easier. As will be more fully apparent hereinafter, the key pin 118 comprises an element which can be inserted through the key slot 96 and turned out of registry therewith to engage the back face 138 of the nose plug 42.

The pull shaft 120 comprises a forward end 140 sized to pass through the key slot 96 when the central section 128 of the key pin 118 resides therein, preferably residing in the notch 54. The extreme end 142 of the forward end 140 comprises a hook like element having a shoulder 144 perpendicular to an axis 146 defined by the key slot 96 when the pull shaft 120 is in use. The forward end 140 also comprises an intermediate section 146 sufficiently thin to pass through the key slot 96 and approximately the same thickness as the central section 128 of the key pin 118. The section 146 provides a flat or planar surface 148 for receiving a flat side of the central section 128 of the key pin 118.

The forward end 140 merges with an enlarged threaded shank 150 at a location which does not pass through the key slot 96. The shank 150 includes a flat surface 152 coplanar with the surface 148 for receiving the second end 136. As will be apparent, finger pressure by the user pushes the second section 136 against the flat surface 152 and helps immobilize the key pin 118 during use.

The support or spacer 122 is typical of supports used in connection with pullers and comprises a generally circular body 154 interrupted by an axial slot 156 so the support 122 may be inserted onto the pull shaft 120 along a path perpendicular to the axis 146. The support 122 conveniently comprises an enlarged passage 158 opening through a surface 160 which will abut the door 32 of the safety deposit box and a smaller passage 162 which is only modestly larger than the diameter of the threaded shank 150. The passage 158 is larger than the diameter of the sleeve 46 and is preferably considerably larger. The support 122 accordingly provides a reaction surface 164 which will be acted on by the nut 124.

The nut 124 is of conventional design of the star nut type and acts as a simple wing nut. The star nut 124 includes a central body section 166 having a central threaded passage 168 sized to threadably receive the shank 150. A plurality of ears 170 afford the user a mechanical advantage in turning the star nut 124.

The key pin 118, pull shaft 120, support 122 and star nut 124 are used together to pull the nose plug 42 of the lock 10 in a manner that does not damage the nose plug 42, which is simple and expeditious and which is completely reversible in the sense that the operation can be stopped at any time and the lock 10 returned to its original condition.

First, the key pin 118 is oriented so that the first end 130 is aligned with the key slot 96 and notch 54 and inserted therein until the key pin 118 can be turned or rotated until the end 130 is out of registry with the key slot 96. Preferably, the key pin 118 is turned 90° so the end 130 is essentially perpendicular to the slot 96. At this point, the end 130 is either in engagement with the back face 138 of the nose plug 38 or close to engagement therewith. The key pin 118 is then shifted laterally out of the key slot 96 into the area provided by the notch 54. It will be appreciated that the end 130 is sized, in a direction perpendicular to the axis 134, to be largely under the rim 52 in this perpendicular position. Because of the size of the key slot 96, it will be evident that the key pin 118 is rather small. The actual size of the end 130 is about ¼" perpendicular to the axis 134, about 0.090 inches parallel to the axis 134 and about 0.062 inches thick. The actual size of the central section 128 is about 0.062 inches square and about 0.65 inches long. Because the central section 128 extends out of the key slot 96, it will be apparent that it may be longer or shorter as desired.

With the key pin 118 in place and out of the way in the slot 54, the pull shaft 120 is inserted through the key slot 96 until the extreme end 142 is inside the lock 10 beyond the end 130 of the key pin 118. The key pin 118 is then moved laterally back into the key slot 96 until the central section 128 abuts the surface 148 and the second end 136 abuts the flat surface 152. The user then clamps the key pin 118 to the pull shaft 120 by finger pressure.

The support 122 is then placed over the pull shaft 120, preferably by moving it over the side of the pull shaft 120. The user takes advantage of the slot 156 by passing the slot over the user's finger to maintain finger pressure clamping the key pin 118 to the pull shaft 120. The star nut 124 is rapidly advanced on the threaded shank 150 until the shoulder 144 of the pull shaft 120 pulls the shoulder 131 to place the shoulder 132 against the back face 138 of the nose plug 42 and the support 122 is clamped between the support 124 and the door 32. Turning the star nut 124 necessarily slows down at this point because it is necessary to apply a sufficient force to the pull shaft 120 to pull the nose plug shaft 84 out of its press fit engagement with the cam element 110 and to pull the sleeve 46 out of its press fit engagement with the plate opening 50. Turning of the star nut 124 eventually pulls the nose plug 42 and the sleeve 46 loose so they can be removed from the lock 10.

At this time, the guard key (not shown) may be inserted through the key slot 94 and turned to shift the leaves 70 to their unlocking position. To unlock the lock 10, one would think it necessary to shift the leaves 72 to their unlocking position and rotate the cam element 110 to shift the striker plate 58 to retract the striker block 68 and unlock the lock 10. Oddly, the offset notch 81 of the wafers 72 are biased into a position to receive the rib 66. Thus, the only thing that needs to be done is to shift the striker plate 58 to move the rib 66 through the aligned notches 78, 81. Although this may be accomplished by the use of a small screwdriver or the like, the cam key 126 is provided for this purpose.

The cam key 126 comprises a handle 172 having a shaft 174 thereon sufficient in length to place an enlargement 176 in the opening 108 of the cam element 110. The enlargement 176 is preferably slightly smaller than the flats 106 on the nose plug 42 and fits easily into the opening 108. Although it may not appear so in FIG. 1, there is a very narrow passage between the wafers 70, 72 leading from the cover 14 toward the cam element 110. After the enlargement 176 is inserted in the opening 108, the cam key 126 is then turned thereby turning the cam element 110 and moving the striker plate 58 to the right in FIG. 1 to retract the striker block 68 from latching engagement with the strike plate 18 thereby unlatching the door 32. With the door 32 open, the housing 12 can be removed from the backside thereof by removing the threaded fasteners (not shown) passing through the cutouts 30. It will accordingly be seen that the kit 116 allows the nose plug 42 to be pulled from its press fit position in the lock 10 in a simple and expeditious manner without destroying the nose plug 42 or otherwise damaging the lock 10.

Although this invention has been disclosed and described in its preferred form with a certain degree of particularity, it is understood that the present disclosure of the preferred form is only by way of example and that numerous changes in the details of operation and in the combination and arrangement of parts may be resorted to without departing from the spirit and scope of the invention as hereinafter claimed.

I claim:

1. A method of pulling a nose plug of a lock of the type including a cover having a sleeve extending therefrom and providing a passage therein, a nose plug rotatably received in the passage and having a key slot therein, a cam for operating the lock and unlocking the same, a shaft rigid with the nose plug and means comprising a press fit removably attaching the shaft and the cam, the method comprising the steps of inserting a transverse end of a T-shaped element through the key slot;

rotating the T-shaped element to positon the transverse end out of registry with the key slot;

inserting a pull shaft into the key slot and into force transmitting engagement with the T-shaped element;

placing the T-shaped element in force transmitting engagement with the nose plug; and imparting an axial force to the pull shaft in a direction away from the lock and pulling the nose plug shaft out of press fit connection with the cam.

2. The method of claim 1 wherein the sleeve provides a notch opening into the passage and communicable with the key slot in one rotational position of the nose plug, comprising the additional step of before inserting the pull shaft into the key slot, moving an axial segment of the T-shaped element into the sleeve notch out of the way of the pull shaft; and after inserting the pull shaft into the key slot, moving the T-shaped element out of the sleeve notch into force transmitting engagement with the pull shaft.

3. The method of claim 1 further comprising inserting a cam key through the cylindrical passage into driving engagement with the cam, rotating the cam key and manipulating the cam for unlocking the lock.

4. The method of claim 1 wherein the cover comprises a plate having an opening therein, the sleeve being press fit in the plate opening, the sleeve comprising a rim thereon having the notch therein, the nose plug being restrained by the rim from movement away from the cam and the imparting step comprises imparting an axial force to the pull shaft in a direction away from the lock and pulling the nose plug against the sleeve rim and pulling the sleeve out of its press fit connection with the cover plate.

5. The method of claim 1 wherein the nose plug includes a back face from which the shaft extends, the T-shaped element provides a first shoulder for engaging the nose plug back face and a second shoulder generally parallel to the first shoulder and spaced therefrom, the pull shaft comprises a hook shaped end having a shoulder thereon for engaging the second T-shaped element shoulder and wherein the imparting step comprises engaging the pull shaft shoulder with the second T-shaped element shoulder and then pulling the pull shaft away from the lock.

6. The method of claim 5 wherein the pull shaft comprises a threaded end opposite from the hook shaped end and the imparting step comprises placing a support around the threaded end of the pull shaft; and threadably advancing a nut along the threaded pull shaft end.

7. A tool and lock combination for use in the process of pulling a nose plug from the lock comprising a frame having a cover plate carrying first and second sleeves having a cylindrical passage therethrough and a notch opening into the passage;

a striker extending from the frame for engagement with a strike plate;

a plurality of wafers in the frame having a notch at one end thereof, the notches preventing movement of the striker when the notches are unaligned and providing a path of movement of the striker away from a locked condition toward an unlocked condition when the notches are aligned;

means pivotally mounting the wafers on the frame about an axis for movement between a notch aligned position to a notch unaligned position;

a guard key nose plug, having a key slot therein, mounted in the first sleeve for rotary movement in a path allowing a guard key to cam selected ones of the wafers toward the notch aligned position;

a rent key nose plug, having a key slot opening through a nose plug back wall, mounted in the second sleeve for rotary movement in a path allowing a rent key to cam selected ones of the wafers toward the notch aligned position, a shaft extending therefrom and a cam press fit on the shaft positioned to cam the striker away from the strike plate; and means for pulling the rent key nose plug and shaft out of press fit with the cam, including a key pin having an axial section having a T-shaped end, the axial section extending through the rent nose plug key slot and the T-shaped end being out of registry with the rent nose plug key slot to abut the nose plug rear wall, a pull shaft having a first end extending through the rent key nose plug key slot and providing a shoulder abutting the force transfer element in force transmitting relation, and means for applying a force to the pull shaft in a direction away from the frame cover plate.

8. The lock of claim 7 wherein the key pin comprises a planar rigid blank of material having a second T-shaped end on the axial section opposite from the first mentioned T-shaped end; and the pull shaft comprises a second shoulder abutting the second T-shaped end and a planar surface interconnecting the first and second pull shaft shoulders, the axial section abutting the planar surface.

9. The lock of claim 7 wherein the key slot is slightly larger than about 0.062 inches wide and the key pin blank is not greater than about 0.062 inches thick, the key pin axial section having a maximum dimension transverse to a longitudinal axis thereof of not greater than about 0.062 inches.

10. A nose plug puller kit for a Mosler type safe deposit box lock, comprising a key pin made of a flat rigid material not greater than 0.062 inches thick having an axial intermediate section not greater than 0.062 inches wide, a first T-shaped end providing a first shoulder facing the intermediate section and a second shoulder facing away from the intermediate section, and a second T-shaped end having a shoulder facing away from the intermediate section;

a pull shaft having a first end not greater than 0.062 inches thick providing a hook shaped terminus providing a first shoulder abutting the second shoulder of the first T-shaped end, a second threaded end substantially larger than the first end providing a second shoulder abutting the shoulder of the second T-shaped end, and a planar face spanning the first and second ends from the first pull shaft shoulder to the second pull shaft shoulder, the axial intermediate section of the key pin removably residing on the on the planar face; and means for applying an axial force to the pull shaft.

* * * * *